United States Patent [19]
Asberg

[11] 3,944,305
[45] Mar. 16, 1976

[54] ROLLER BEARING PROVIDED WITH FLANGES

[75] Inventor: Sture Lennart Asberg, Goteborg, Sweden

[73] Assignee: SKF Nova AB, Goteborg, Sweden

[22] Filed: Apr. 9, 1973

[21] Appl. No.: 349,507

[30] Foreign Application Priority Data
Apr. 18, 1972 Netherlands .................... 7205167

[52] U.S. Cl. ........................................... 308/187.1
[51] Int. Cl.² ......................................... F16C 33/78
[58] Field of Search .............. 308/187.1, 187.2, 191

[56] References Cited
UNITED STATES PATENTS

| | | | |
|---|---|---|---|
| 2,333,867 | 11/1943 | Kucho, Jr. ........................ | 308/190 |
| 2,494,009 | 1/1950 | Shays ............................... | 308/190 |
| 3,519,316 | 7/1970 | Gothberg ......................... | 308/187.1 |
| 3,583,511 | 6/1971 | Asberg ............................. | 308/190 |
| 3,642,335 | 2/1972 | Takahashi et al ................ | 308/187.1 |
| 3,717,394 | 2/1973 | Pitner .............................. | 308/187.1 |
| 3,819,243 | 6/1974 | Asberg et al. ..................... | 308/191 |

*Primary Examiner*—Robert R. Song
*Assistant Examiner*—Richard A. Bertsch
*Attorney, Agent, or Firm*—Daniel M. Rosen

[57] ABSTRACT

A roller bearing provided with flanges and having an inner ring, an outer ring and roller elements therebetween, sealed to prevent penetration of foreign matter, and constructed so that at least one of the rings is integral with two flanges extending on either side of the ring.

11 Claims, 3 Drawing Figures

ROLLER BEARING PROVIDED WITH FLANGES

The invention relates to bearings and particularly a roller bearing provided with flanges, and having between an inner ring an outer ring, and roller elements arranged in addition, sealing means preventing the penetration of dust, soil and the like is provided between the roller elements.

It is the principal object of this invention to provide a roller bearing unit which structurally improves stability and rigidity to its environment.

It is a further object of this invention to provide a roller bearing unit which is capable of absorbing and neutralizing various loads in an efficient manner.

According to the invention at least one of the bearing rings is provided integrally with two flanges, extending on either side of said ring. These measures result in a rigid and at least axially small bearing unit which is additional connectable at both sides.

In accordance with an advantageous embodiment of the invention the inner bearing ring is provided with two flanges, radially opposed and arranged to form one piece with the inner bearing ring. Another feature of the invention relates to the sealing means for the bearing, and to that feature an end part of a sealing element is supported against the inner ring and a curved portion thereof, which forms the transition between the inner ring and the flange, while the other end part is fixed to a collar of a flange-shaped outer ring. In this favorable manner, sealing is realized between the surroundings and the roller elements in the bearing. In a preferred embodiment of the invention the sealing element is provided with an end part which, according to the longitudinal sectional view of the bearing, develops to two ends separated from each other.

BRIEF DESCRIPTION OF THE DRAWINGS

The invention will now be described in detail with reference to the accompanying drawings which show advantages and other characteristics of various embodiments of the invention, and wherein.

DETAILED DESCRIPTION OF THE PREFERRED EMBODIMENTS

Figure 1:
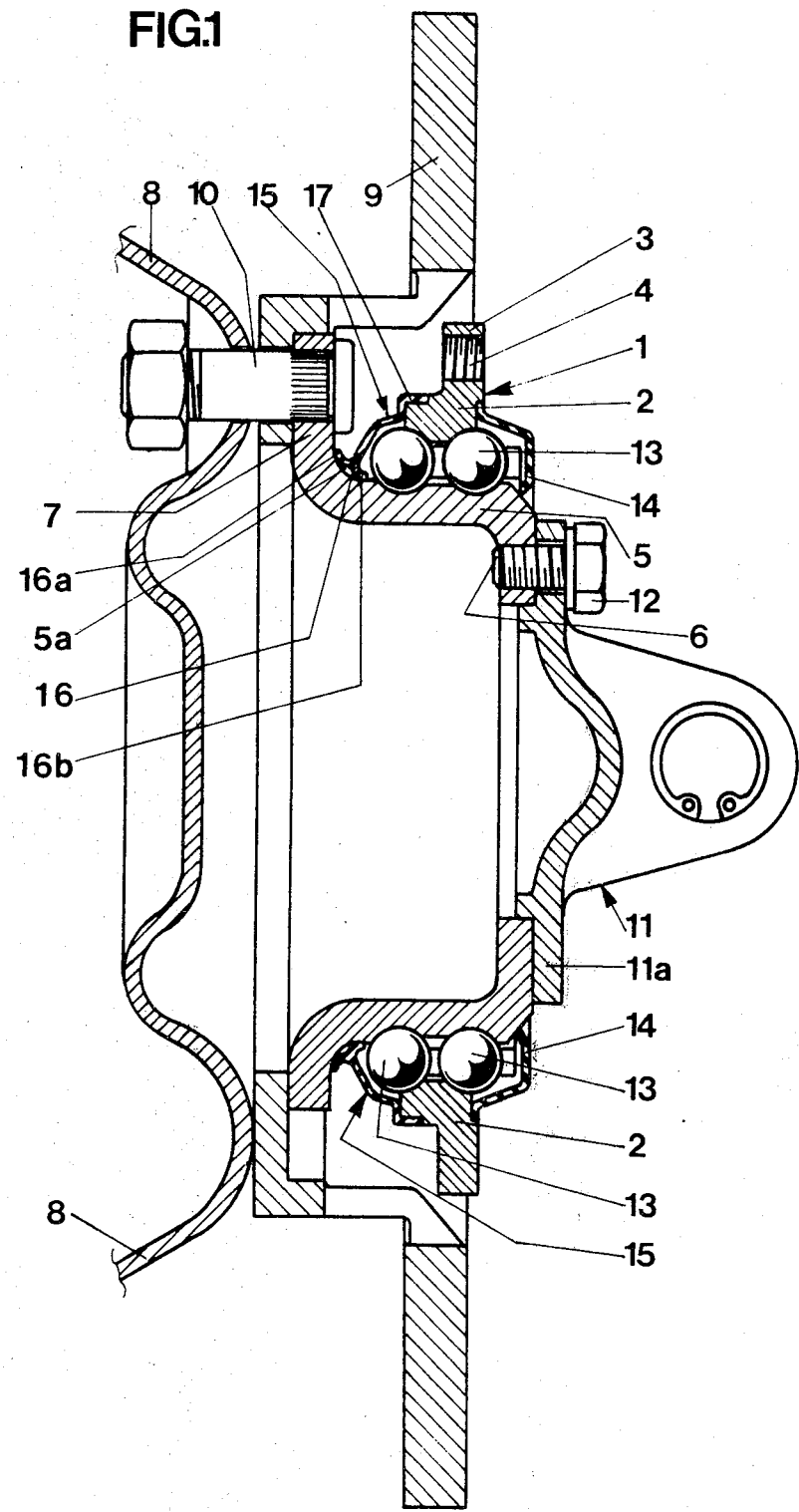
FIG. 1 is a longitudinal sectional view of a bearing according to the invention.

FIG. 1 is a longitudinal sectional view of a bearing according to the invention, which forms a part of a wheel usable with automotive equipment, for instance a motorcar. The bearing 1 comprises an outer ring 2 having a flange 3. The flange 3 is provided with bolt-apertures 4 for fixing this part to the body of the vehicle (not represented in the drawing). The bearing 1 furthermore comprises an inner ring 5, which is provided with two flanges 6 and 7, the flange 7 supporting part 8 of a wheel and a brake disc 9. The wheel and the brake disc are connected with the inner ring 5 by means of bolt connections 10. In an advantageous embodiment the other flange 6 is connected to a part 11 of a drive mechanism of the vehicle (not shown). The part 11 is also connected with the inner ring 5 by a bolt connection 12.

An advantageous feature of this improvement is that the inner ring and the flanges display a substantially uniform thickness, which permits simple manufacturing of the bearing and increased stability of the entire construction. In the case where only a wheel has to be considered instead of a drive mechanism 11, a cap 11A can be fixed on the flange 6, thereby increasing the stability. Between the rings 2 and 5 of the bearing 1 roller elements 13 are arranged. In this embodiment the elements 13 together with the rings 2 and 5 form a double angle-contact bearing.

In the described preferred embodiment according to the invention, sealing of the elements 13 comprises sealing means 14 and 15 of a special form, whereby at least one of them is characterized in that the sealing means displays an end part 16 contacting both the inner ring 5 and a curved part 5A thereof, which forms the transition or junction part between the inner ring 5 and the flange 7. The other end part 17 or the sealing means is connected to a collar of the flange 3 of the outer ring 2.

An advantage of such sealing arrangement is that the end part 16 of the sealing element 15 ends in two parts 16A and 16B separated from one another, thereby ensuring a complete sealing. It is also advantageous to compose the sealing element 15 of an elastic material, e.g. rubber. However, it is preferable to construct the element 15 in a manner such that the middle part and/or end part 17 arranged over the roller elements 13 is composed of an other, more rigid material than the ends 16A and 16B of part 16. In this way a good cooling effect and durability is obtained. The sealing element 14 is prepared from two types of material as well, improving or optimizing durability and functioning. For this purpose various materials, in layers of identical and/or different thickness can be bonded with one another. On the other hand, it is also possible to use a homogeneous, elastic and wear resistant material for the sealing element as well.

Figure 2:
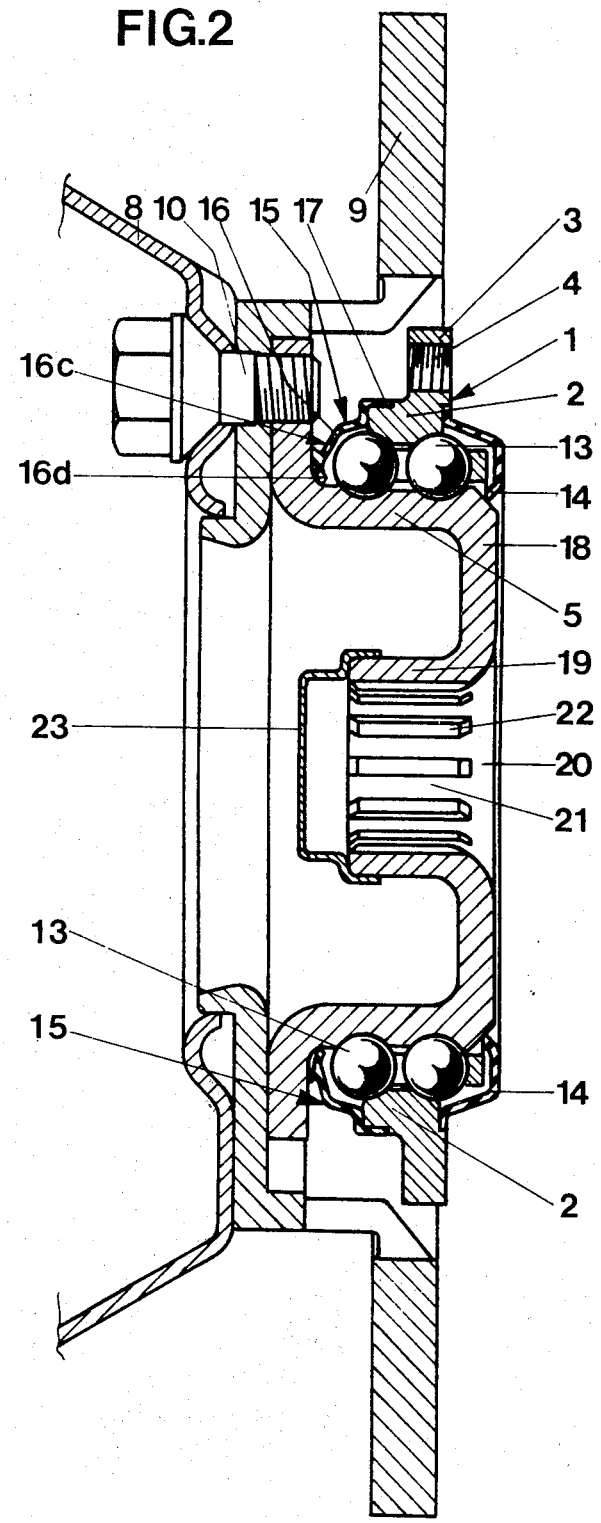
FIG. 2 is a longitudinal sectional view of an alternative embodiment of the invention.

FIG. 2 represents also a longitudinal sectional view of another embodiment of a roller bearing according to the invention, wherein the flange 18 has a particular function. It should be pointed out that identical parts are numbered by the same references as shown in FIG. 1. According to FIG. 2 the inner ring 5 comprises a flange 18, displaying an axially arranged flange part 19, capable of carrying the end part 20 of a shaft (not shown). In this advantageous embodiment the shaft part 20 is provided with recesses 21, from which extend the longitudinal ribs or ridges 22 of the said flange part 19. On said part 19, moreover, a cap 23 is fitted ensuring a dust-free sealing. In this advantageous embodiment the wheel part 8 has a slightly modified form as compared to the wheel part 8 shown in Fig. 1. An advantage of this arrangement is that the sealing element 15 has a part 16 comprising two lip-shaped ends 16c and 16d of different sizes. In this way a sealing element is obtained which is suitable to various conditions. The roller bearing unit according to FIG. 2 also has the advantage that the bearing ring 5 forming the linking element between the drive shaft 20 and the wheel 8 now forms a rigid, stable and practical embodiment, due to the special form of the flanges 18 and 19 thereof.

Figure 3:
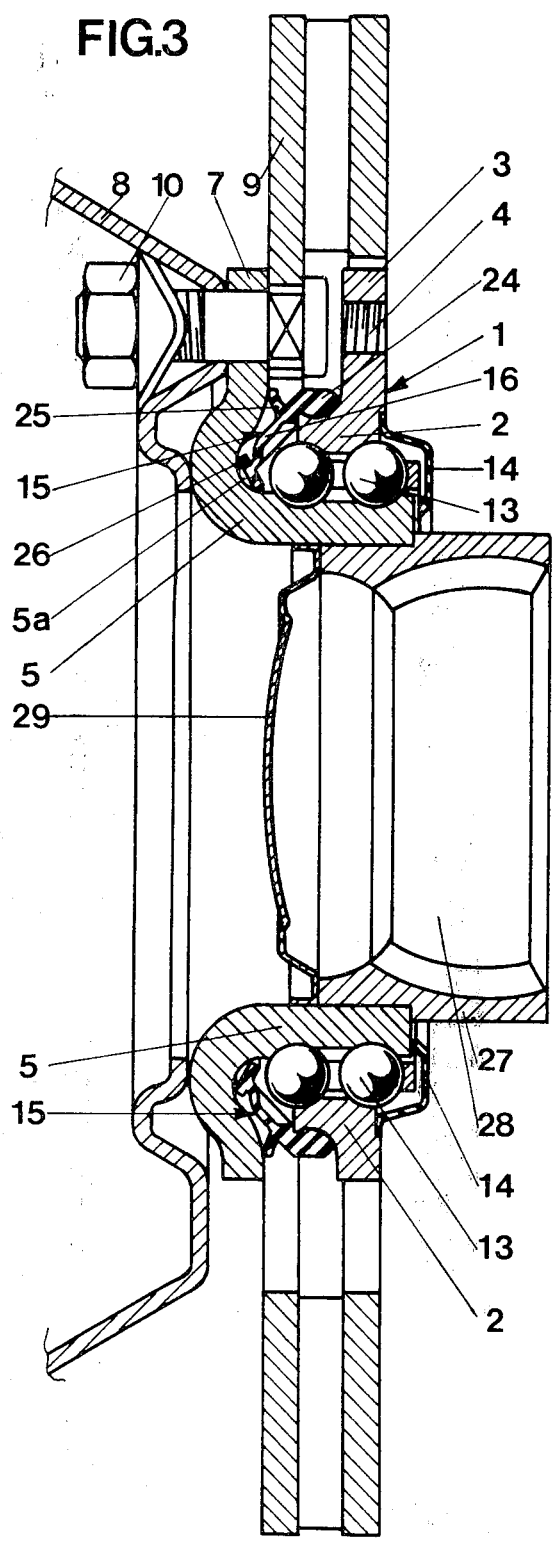
FIG. 3 is a longitudinal sectional view of a further alternative embodiment of the invention.

FIG. 3 shows a longitudinal sectional view of another embodiment of a bearing according to the invention, wherein the sealing means and the inner ring 5 display a very suitable form, although there are some differences in the structure of the wheel parts 8 and the bolt connections 10, in view of the description of the invention these elements and the brake disc 9 are of lesser importance in the embodiment. The sealing element 15, which together with the sealing element 14 forms the sealing of the bearing 1, is made of an elastic material, preferably rubber, and features a thickened end part 24 ensuring a reliable fastening of the element 15 on the flange 3 of the outer ring 2.

A further advantageous structural detail is that in the proximity of the transition of part 24 to the middle part 16 of the sealing element 15 a third lip 25 is provided, leaning or supporting against the flange 7. Such an arrangement ensures an optimum sealing under practically any operative condition. Also, according to this view the end part 26 has two contact points with the curved transition 5a of the inner ring 5 towards the flange 7, which enhances this effect. Furthermore, on the inner ring 5 a shaft part 27 is mounted, for example by shrinking, provided with a ball joint 28. The coupling between the shaft part 27 and the bearing 1 is hermetically closed by means of a cap 29, made of a suitable material and clamped in the inner ring 5.

In this way the invention introduces a roller bearing unit which, upon being applied as a structural element for example to the wheel construction of an automotive equipment, on the one hand contributes to improving the stability and rigidity of the whole construction and on the other hand is capable of absorbing and neutralizing variable loads in an efficient manner.

I claim:

1. In a roller bearing including inner and outer rings with an annular space defined between said rings, the space and the rings having corresponding first and second ends, a plurality of roller elements in said space, and sealing means extending from one of said rings to the other for closing the roller elements within said two ends of said annular space, the improvement in combination therewith comprising first, second, and third flanges, wherein said first flange comprises a junction part adjacent the first end of said inner ring and an outer part extending generally radially outward from said junction part, said second flange extends generally radially inward from said second end of the inner ring, said third flange extends generally radially outward from said outer ring, with said roller elements being situated generally axially intermediate said first and second flanges, said first end of the outer ring formed as a collar having an outer periphery, and said sealing means of said first end comprising an elastic material having a relatively thickened part secured on said collar and a relatively thinner part extending to and engaging said inner ring in sliding contact.

2. A roller bearing according to claim 1 wherein said flanges are integral with the rings to which they are attached.

3. A roller bearing according to claim 1 wherein said sealing means is an elastic material.

4. A roller bearing according to claim 1 wherein said radially-inwardly extending flange comprises reinforcing means.

5. A roller bearing according to claim 1 wherein said two lips have different dimensions.

6. A roller bearing according to claim 1 wherein said sealing means comprises an annular element having a first end secured to one of said rings and a second opposite end secured in sliding contact with the other ring.

7. A roller bearing according to claim 6 wherein said second end of the sealing means comprises first and second spaced apart lips forming two lines of contact with said other ring.

8. A roller bearing according to claim 7 wherein said lips are more resilient than the remainder of the sealing means.

9. A roller bearing according to claim 7 wherein said junction part of the first flange comprises a curved, generally L-shaped surface, and said lips of the sealing means contact said curved surface.

10. A roller bearing according to claim 7 wherein said sealing means comprises a third lip extending therefrom intermediate said ends of the sealing means and forming a third line of sliding contact with said other ring.

11. In a roller bearing including inner and outer rings with an annular space defined between said rings, the space and rings having corresponding first and second ends, a plurality of roller elements in said space, and sealing means at each of said ends secured to one of said rings and extending to the other ring for sliding contact therewith for closing the roller elements within said two ends of said annular space, the improvement in combination therewith comprising first and second flanges wherein said first flange comprises a junction part adjacent said first end of the inner ring and an outer part extending generally radially outward from said junction part, and said second flange extends generally radially outward from said second end of the outer ring, said first end of the outer ring formed as a collar having an outer periphery, and said sealing means at said first end comprising an elastic material having a relatively thickened part secured on said collar and a relatively thinner part extending to and engaging said inner ring in sliding contact.

* * * * *

UNITED STATES PATENT AND TRADEMARK OFFICE
CERTIFICATE OF CORRECTION

PATENT NO. : 3,944,305
DATED : March 16, 1976
INVENTOR(S) : Sture Lennart Asberg It is certified that error appears in the above-identified patent and that said Letters Patent are hereby corrected as shown below:

Column 1, line 3, after "particularly" insert --to--;

lines 4 and 5, delete "between";

line 5, after "inner ring" insert --,--;

line 6, after "arranged" insert --between.--; delete "in" and insert --In--;

line 21, after "invention" insert --,--.

Column 2, line 17, delete "or" and substitute --of--;

line 66, after "form" delete "," and insert --.--; delete "although" and insert --Although--.

Column 3, line 8, after "detail" insert --,--.

Signed and Sealed this

Twelfth Day of October 1976

[SEAL]

Attest:

RUTH C. MASON
Attesting Officer

C. MARSHALL DANN
Commissioner of Patents and Trademarks